(12) United States Patent
Hefele et al.

(10) Patent No.: US 7,370,777 B2
(45) Date of Patent: May 13, 2008

(54) QUICK FASTENER

(75) Inventors: Christian Hefele, Breitenbrunn (DE);
Franz Popp, Buchloe (DE)

(73) Assignee: Hilti Aktiengesellschaft, Schaan (LI)

( * ) Notice: Subject to any disclaimer, the term of this patent is extended or adjusted under 35 U.S.C. 154(b) by 23 days.

(21) Appl. No.: 10/855,092

(22) Filed: May 27, 2004

(65) Prior Publication Data

US 2004/0239113 A1  Dec. 2, 2004

(30) Foreign Application Priority Data

May 30, 2003  (DE) ................................ 103 24 675

(51) Int. Cl.
*B67D 3/00*   (2006.01)
(52) U.S. Cl. ........................ 222/520; 286/390; 286/901
(58) Field of Classification Search ................ 285/390, 285/901, 391; 222/519, 499, 568, 562, 551, 222/553, 520, 548
See application file for complete search history.

(56) References Cited

U.S. PATENT DOCUMENTS

| | | | | | |
|---|---|---|---|---|---|
| 3,473,782 | A | * | 10/1969 | Gessic | ......................... 285/316 |
| 4,266,813 | A | * | 5/1981 | Oliver | ......................... 285/390 |
| 4,340,154 | A | * | 7/1982 | VanManen | .................... 222/94 |
| 4,595,123 | A | * | 6/1986 | Libit | ........................... 285/391 |
| 5,462,317 | A | * | 10/1995 | Keller | .................... 285/148.23 |
| 5,573,281 | A | * | 11/1996 | Keller | ........................... 285/40 |
| 5,769,466 | A | * | 6/1998 | Noel et al. | .................. 285/390 |
| 6,129,243 | A | * | 10/2000 | Pal et al. | ...................... 222/94 |

* cited by examiner

*Primary Examiner*—David Bochna
(74) *Attorney, Agent, or Firm*—Abelman, Frayne & Schwab

(57) ABSTRACT

A quick-acting closure (1) for connecting a mixer tube (3) and a connecting part (2) of an extruder unit. The connecting part (2) has a connector (9) with a conical threaded base member, on which an external thread (12) is arranged. The mixer tube (3) has a conical threaded base member, on which an internal thread (19) is arranged. The internal thread (19) on the connector part (16) of the mixer tube (3) is a multi-path internal thread.

5 Claims, 2 Drawing Sheets

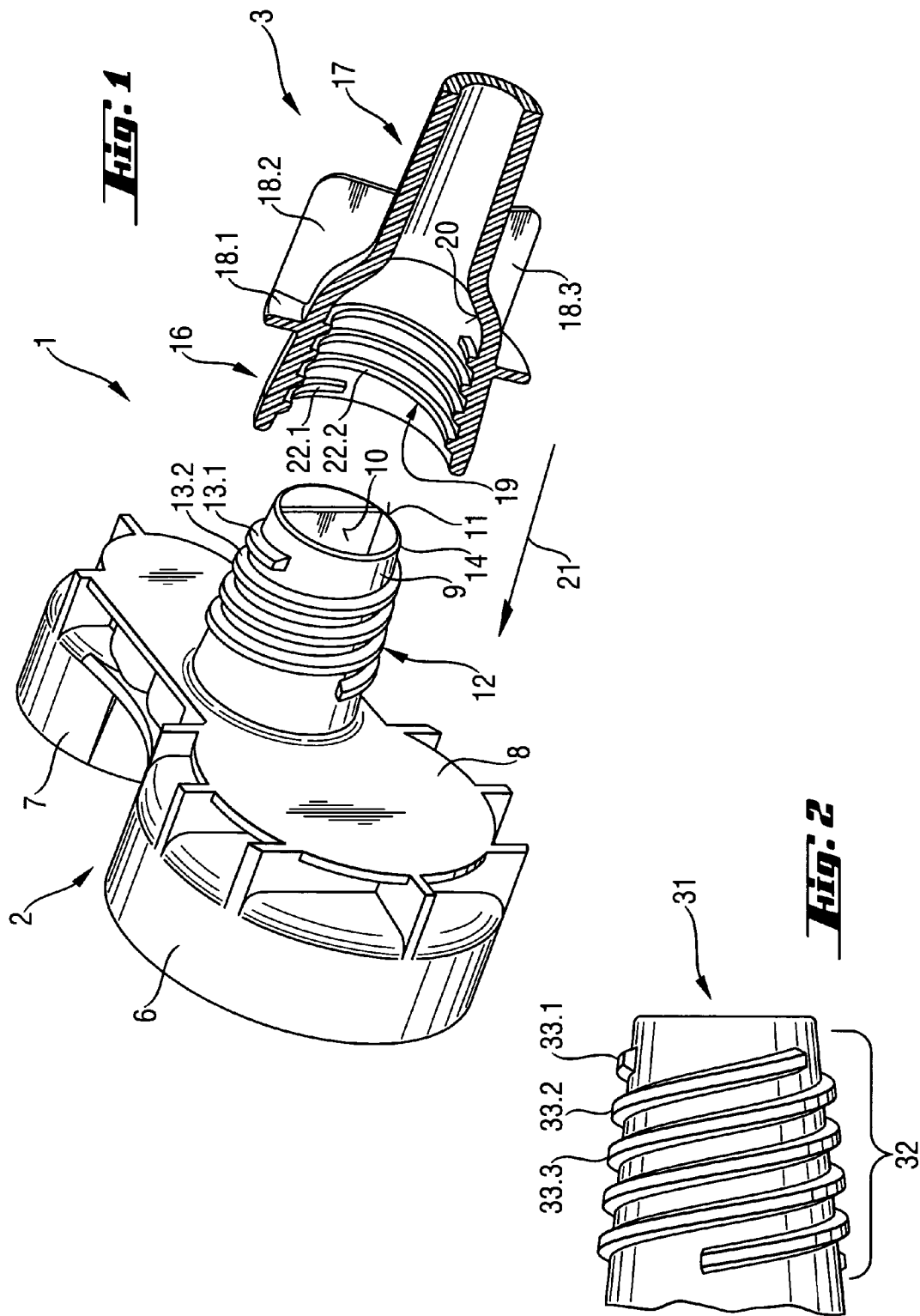

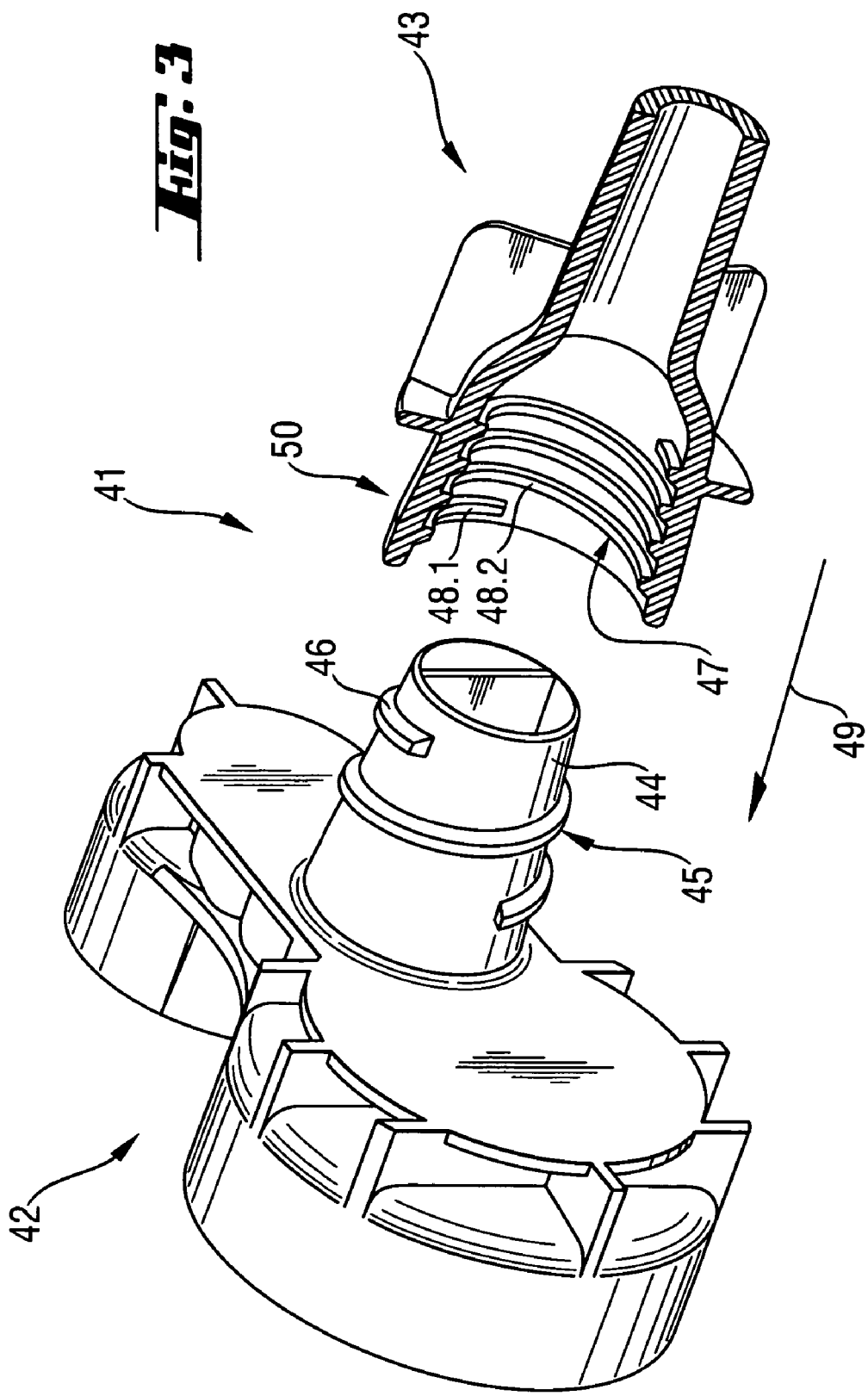

QUICK FASTENER

BACKGROUND OF THE INVENTION

The invention relates to a quick fastener for connecting a first part and a second part for connecting a mixer tube and a connector part of an extruder unit. The first part has a conical threaded base member with an external thread running along the conical threaded member. The second part has a conical threaded base member with an internal thread running in the conical threaded base member.

The bayonet coupling is known as a quick-acting fastening or closure, wherein one part is inserted with a tappet into another part having a corresponding receptacle, and by rotation is fastened to the first part. DE 198 38 560 discloses a rotary quick-acting closure for interconnecting a plurality of structural parts with each other, whereby the holding part has clamping projections, which engage a second structural part by rotating the holding part. This known quick-acting closure can be quickly closed and can translate only limited high forces.

Particularly in an extrusion unit for paste-like masses high forces occur at the interface of connecting part and a mixer tube, said forces having to be sustained by the connection. Cylindrical round threads are well-known for translation of these high forces over the connection. These are expensive in this application because several rotations are required for establishing the connection between the parts.

U.S. Pat. No. 4,798,195 A discloses a closure that has a connection associated with a conical thread with progressively decreasing diameter in the direction of the opening. The container can be closed with minimum rotation by virtue of the closure cap configured to be complementary to the connection. The drawback in this solution is that manufacturing the thread in an injection molding process is very expensive, in terms of time and cost, because of the completely necessary unwinding of the thread.

U.S. Pat. No. 4,699,285 A discloses a closure for bottles, wherein the thread are conically inclined on the bottle and the zone of the thread has a constant wall thickness and uniform flank height. The drawback of this solution is using this connection that is capable of sustaining only conditionally high forces such as those that occur in connections in extrusion units.

SUMMARY OF THE INVENTION

The object of the invention is to provided a quick-acting closure for connecting two parts, which can be established with maximum user safety and reliability, while being easy to use and simple and inexpensive to manufacture.

The object of the invention is achieved according to the invention by a quick-acting closure for connecting a first part and a second part, in particular for connecting a mixing tube and a connector part of an extrusion unit. The closure has a first part with a conical thread base member and an external thread running along the conical thread member. The second part has a conical threaded base member with an internal thread running into the conical threaded base member. The internal thread on the second part of the quick-acting closure is multiple threads with several thread lines.

The internal thread on the second part of the quick-acting closure according to the invention can have two, three or more thread flights. The external thread on the first part has at least one thread flight, which in its configuration, as the pitch and dimensions, can engage in the multi-thread internal thread on the second part. The first part and the second part are inserted into each other, until the at least one thread flight of the external thread makes contact with the crests of the thread of the multi-tread internal thread. Then the parts are rotated with each other, so that the external thread and the internal thread interlock with each other. When this is done, the thread flanks of the external thread contact one of the thread flanks of the internal thread. The multiple thread characteristic of the internal thread makes a quick assembly of the connection possible. Furthermore, the parts of the quick-acting closure according to the invention can be economically manufactured in terms of time and costs. Accordingly, the conical base member of the first part and that of the second part have a constant wall thickness or a wall thickness that varies in thickness, which preferably increases continuously from the free end.

In an alternative, the internal thread has fewer thread flights than the external thread. At least one thread flight of the internal thread in this embodiment is configured such that this thread flight can accommodate at least two thread flights of the external thread.

Preferably, the external thread on the first part is complementary to the internal thread on the second part. The number of thread flights on the external thread can be less than or equal to the number of thread flights of the internal thread, insofar as the pitch and the form of the thread flights on the external thread correspond with the pitch and the form of the thread flights of the internal thread. The external thread preferably has the same number of thread flights as the internal thread. In this embodiment, a plurality of thread flanks of the external thread contact the thread flanks of the internal thread such that the transmission of forces in the quick-acting closure according to the invention occurs over several flanks of the thread and higher forces than those in the known closure embodiments can be transmitted.

Preferably, the external thread is a saw-tooth thread. This form of screw thread allows transmission of higher forces. In addition, other thread forms can also be utilized, such as a trapezoidal thread, in the quick-acting closure according to the invention.

Advantageously, a seal closure is arranged on the leading edge of the first part for sealing the connection between the first part and the second part. On the free leading edge of the first part a sealing lip is provided, which assures the seal of the connection when assembling the two parts.

Preferably, the second part has a receptacle, in particular for centering a sealing lip. The conical zone of the second part has a change in inclination for the formation of a receptacle so that in this zone there is a steeper cone than that of the zone of the internal thread. The free leading edge can have an external diameter that is configured larger than the inside diameter on the second part to assure the seal of the connection, so that there is a perfect seal resulting from the material compression when the two parts are assembled. If the free leading edge is provided with a sealing lip, the receptacle can be configured for centering of the sealing lip and for assuring the perfect seal. In an alternative to the embodied seals of the connection, the second part is provided on the inside with a suitable seal such as a sealing lip, which assures the seal with the quick-acting closure according to the invention with the free leading edge of the first part, in the assembled condition of the two parts.

Preferably, the first part and/or the second part is/are made of a plastic. If the second part of the quick-acting closure is a mixer tube, it is generally a serial product, which is exchanged prior to continuing to use the content that is to pass through the mixer tube, in the event of an interruption of work. Plastic represents an economical starting material that is easy to shape into the parts of the quick-acting closure according to the invention. Preferably, the manufacture of the first part and/or the second part is done in an injection/molding process, in particular if a plastic is used as the starting material. If the material for manufacturing the mixer tube has a certain malleability the multi-entry internal thread can be configured to have dimensions that are smaller than the dimensions of the at least one thread flight on the external thread. In this embodiment, the first part and the second part of the quick-acting closure clamp together, whereby an intermediate stage of a form-fitting and material-fitting connection is achieved between the two parts. Furthermore, the first part and/or the second part of the quick-acting closure can be manufactured out of metal.

BRIEF DESCRIPTION OF THE DRAWINGS

Other advantageous embodiments and combinations of features of the invention will become apparent from the following detailed description with reference to the drawings, wherein:

FIG. 1 shows a perspective representation of a first exemplary embodiment of the invention with a connection part of an extrusion unit and a mixer tube, in partial cross-section, prior to assembly of the two parts;

FIG. 2 shows a lateral view onto a cutout of a second exemplary embodiment of the first part according to the invention with a three-path external thread, and FIG. 3 shows a perspective representation of a further exemplary embodiment of the invention with a connection part of an extrusion unit and a mixer tube, in partial cross-section, prior to assembly of the two parts.

DETAILED DESCRIPTION OF THE INVENTION

In principle, in the figures identical parts are identified using identical references.

FIG. 1 shows a perspective representation of a first exemplary embodiment of the invention with a connecting part of an extrusion unit and a mixer tube, in partial cross section, prior to assembly of the two parts. The quick-acting closure 1 according to the invention is arranged on an extruder unit (not shown) for extruding a two-component mass and comprises a connecting part 2 as the first part and a mixer tube 3 as the second part.

The connecting part 2 comprises connections 6 and 7 for connection of two containers, one component of the two-component mass to be applied is packaged in each of the two containers. A confluence chamber 8 communicates at the connections 6 and 7, from which the connector 9 branches off. The connector 9 has an partition wall 10, which prevents mixing of the individual components of the two-component mass in the connecting part 2.

The connector 9 has a conical base member. The thickness of the walls of the connector 9 increases from the free leading edge 11 in the direction of the confluence chamber 8, wherein said leading edge can have a sealing lip 14 used as a seal for improved tightness of the assembled parts. A two-path external thread 12 is arranged on the outside of the connector 9, said thread having a first thread flight 13.1 and a second thread flight 13.2, wherein the two thread flights 13.1 and 13.2 run parallel to each other and have the same pitch. The external thread 12 is configured as a saw-tooth thread.

The mixer tube 3 comprises a connector part 16 and a tubular segment 17, in which a static mixer is arranged for assuring perfect mixing of the components of the two-component mass fed into the mixer tube 3. In the zone of the connector part 16, projections 18.1, 18.2 and 18.3 are provided on the external of the mixer tube 3, which facilitate engagement and actuation of the quick-acting closure 1.

The connector part 16 has a conical base member, in which an internal thread 19 is formed at the connector 9 complementary to the external thread 12. The internal thread 19 has a first thread flight 22.1 and a second thread flight 22.2. The pitch and configuration of the thread flights 22.1 and 22.2 of the internal thread 19 correspond to the pitch and substantially the formation of the thread flights 13.1 and 13.2 on the external thread 12. On the end of the connector part 16 facing towards the tubular segment 17 said connector part has a steeper conical slant than in the zone of the internal thread 19.

In the following description, the function of the individual elements of the quick-acting closure 1 according to the invention will be explained using the process of assembly of the connector part 2 and the mixer tube 3. The connecting part 2 is commonly arranged in an extrusion unit (not shown). The mixer tube 3 is guided in the direction of the arrow 21 over the connector 9 on the connecting part 2 until the ends of the external thread 12 make contact at the connector 9 and the thread flights in the end zone of the internal thread 19 in the connector part 16. By means of a rotation about the half circumference, the mixer tube 3 is lock connected with the connecting part 2. In this case, the free leading edge 11 comes into contact with the receptacle 20 of the connector part 16 and perfectly seals the connection between the connecting part 2 and the mixer tube 3.

FIG. 2 shows a lateral view onto a cut-away of a second exemplary embodiment of the first part according to the invention with a three-path external thread. The connector 31 has a conical base member. A three-path external thread 32 is arranged on the outside of the connector 31, which has a first thread flight 33.1, a second thread flight 33.2 and a third thread flight 33.3, whereby the thread flights 33.1, 33.2 and 33.3 run parallel to each other and have the same pitch. The external thread 32 is configured as a trapezoidal thread.

FIG. 3 shows a perspective representation of a further exemplary embodiment of the invention with a connection part of an extrusion unit and a mixer tube, in partial cross-section, prior to assembly of the two parts. The quick-acting closure 41 according to the invention comprises as a first part, the connecting part 42 and as a second part, a mixer tube 43.

The connecting part 42 is configured essentially the same as the connecting part 2 described in FIG. 1, wherein the connector 44 in this embodiment has only one single-path thread 45 with a thread flight 46 arranged on its outside.

The mixer tube 43 is essentially configured the same as the mixer tube 3 described in FIG. 1. The two-path internal thread 47 in the connector part 50 of the mixer tube 43 likewise has a first thread flight 48.1 and a second thread flight 48.2. The pitch and configuration of the thread flight 46 of the external thread 45 on the connector 44 corresponds to the pitch and the configuration of the thread flights 48.1 and 48.2 on the internal thread 47.

The mixer tube 43 is guided in the direction of the arrow 49 over the connector 44 on the connecting part, until the end of the thread flight 46 of the external thread 45 makes contact at the connector 44 and one of the thread flights 48.1 or 48.2 in the end zone of the internal thread 47 in the connector part 50. By means of a rotation about the half circumference the mixer tube 43 is lock connected with the connecting part 42.

In summary, in accordance with the invention, a quick-acting closure is provided for connecting two parts, which by virtue of the configuration of the external and internal thread large forces can be transmitted and accordingly a high degree of user safety provided. In addition, the quick-acting closure according to the invention is easy to use and can be easily and economically manufactured.

What is claimed is:

1. A quick-acting closure (1; 41) for connecting a first part (2; 31; 42) and a second part (3; 43), wherein the first part (2; 31; 42) has a conical base member with an external thread (12; 32; 45) running along the conical base member and the second part (3; 43) has a hollow conical base member with an internal thread (19; 47) complementary to the external thread of the first part and running along a conical opening of a hollow conical base member, and wherein the internal thread (19; 47) on the second part (3; 43) is a multi-path thread with a plurality of thread flights (22.1, 22.2; 48.1, 48.2), and wherein a seal for sealing the closure is arranged at a free leading edge (11) of the first part (2) between the first part (2) and the second part (3).

2. The quick-acting closure of claim 1, external thread (12, 32) has the same number of thread flights (13.1, 13.2) as the internal thread (19).

3. The quick-acting closure of claim 1, wherein the external thread (12; 45) is a saw-tooth thread.

4. The quick-acting closure of claim 1, wherein the second part (3) has a receptacle (20) for centering said seal (14).

5. The quick-acting closure of claim 1, wherein at least one of the first part (2; 31; 42) and the second part (3; 43) is made of a plastic by an injection molding process.

* * * * *